United States Patent

Danielson et al.

[11] Patent Number: 5,354,117
[45] Date of Patent: Oct. 11, 1994

[54] VEHICULAR SEAT CONSTRUCTION

[76] Inventors: Terri M. Danielson; Nicholas R. Harwath, both of W. 6177 Hwy. 569, Iron Mountain, Mich. 49801

[21] Appl. No.: 75,613
[22] Filed: Jun. 14, 1993
[51] Int. Cl.$^5$ ............................................... A47C 7/74
[52] U.S. Cl. ............................ 297/180.15; 297/180.11; 5/421
[58] Field of Search ............... 297/180.1, 180.11, 180.13–180.15, 452.41; 5/284, 421, 422

[56] References Cited

U.S. PATENT DOCUMENTS

| | | | |
|---|---|---|---|
| 2,684,672 | 7/1954 | Summerville | 297/180.1 X |
| 2,722,266 | 11/1955 | Kersten | 297/180.15 |
| 4,773,494 | 9/1988 | Anderson | 297/180.15 X |
| 5,165,127 | 11/1992 | Nicholson | 5/421 |

FOREIGN PATENT DOCUMENTS

| | | | |
|---|---|---|---|
| 379774 | 8/1923 | Fed. Rep. of Germany | 297/180.15 |
| 2172393 | 9/1986 | United Kingdom | 297/180.15 |

Primary Examiner—Peter R. Brown
Attorney, Agent, or Firm—E. Michael Combs

[57] ABSTRACT

A vehicular seat is arranged to include a seat member mounted upon the vehicular seat, with the seat member having a base and back portion having a fluid chamber at each of the base and back portions interconnected by a circulatory pump to direct heated fluid through the seat and back portion for enhanced comfort and accommodating vibration to an individual mounted upon the seat member.

4 Claims, 4 Drawing Sheets

VEHICULAR SEAT CONSTRUCTION

BACKGROUND OF THE INVENTION

1. Field of the Invention

The field of invention relates to vehicular seat apparatus, and more particularly pertains to a new and improved vehicular seat construction wherein the same is arranged to accommodate shock and vibration employing a fluid chamber construction.

2. Description of the Prior Art

Vehicular seats of various types are utilized throughout the prior art and exemplified by the U.S. Pat. Nos. 4,885,827; 3,827,747; 4,838,613; and 4,853,992.

The instant invention attempts to overcome deficiencies of the prior art particularly for use in over-land truck seat construction, wherein the same during seating for large intervals of time requires a seat directed to the ease of shock absorption and impact and in this respect, the present invention substantially fulfills this need.

SUMMARY OF THE INVENTION

In view of the foregoing disadvantages inherent in the known types of vehicular seat constructions now present in the prior art, the present invention provides a vehicular seat construction wherein the same employs a fluid intercommunicating chamber of a seat member base and back portions that is arranged for securement to a vehicular seat. As such, the general purpose of the present invention, which will be described subsequently in greater detail, is to provide a new and improved vehicular seat construction which has all the advantages of the prior art vehicular seat constructions and none of the disadvantages.

To attain this, the present invention provides a vehicular seat arranged to include a seat member mounted upon the vehicular seat, with the seat member having a base and back portion having a fluid chamber at each of the base and back portions interconnected by a circulatory pump to direct heated fluid through the seat and back portion for enhanced comfort and accommodating vibration to an individual mounted upon the seat member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular seat construction which has all the advantages of the prior art vehicular seat constructions and none of the disadvantages.

It is another object of the present invention to provide a new and improved vehicular seat construction which may be easily and efficiently manufactured and marketed.

It is a further object of the present invention to provide a new and improved vehicular seat construction which is of a durable and reliable construction.

An even further object of the present invention is to provide a new and improved vehicular seat construction which is susceptible of a low cost of manufacture with regard to both materials and labor, and which accordingly is then susceptible of low prices of sale to the consuming public, thereby making such vehicular seat constructions economically available to the buying public.

Still yet another object of the present invention is to provide a new and improved vehicular seat construction which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
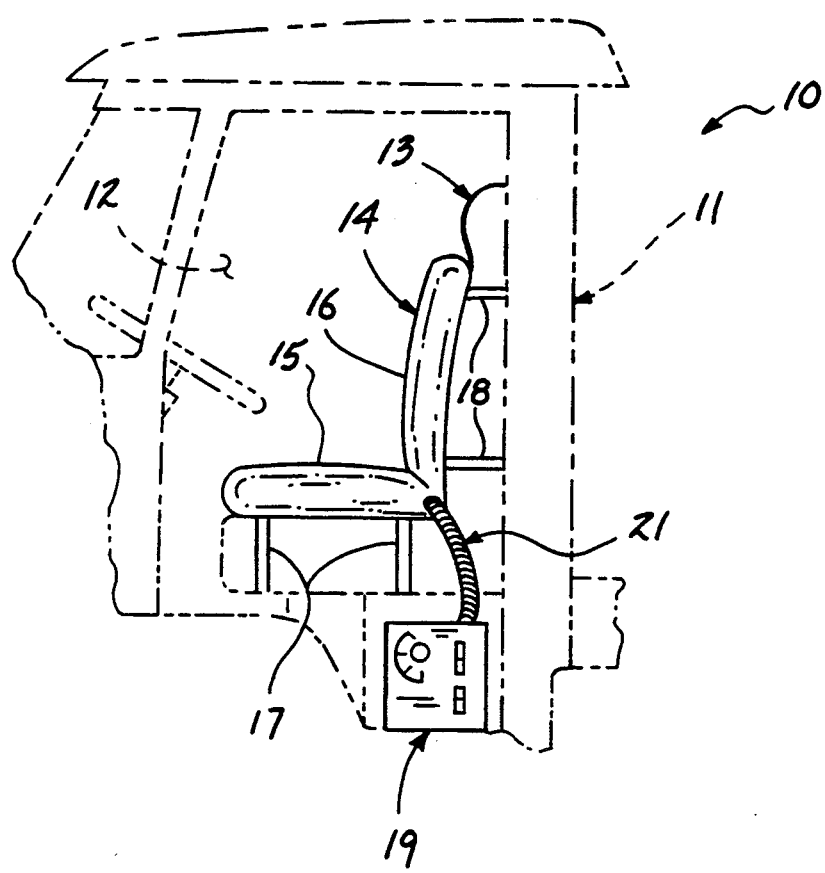
FIG. 1 is an orthographic view of the invention.
Figure 2:
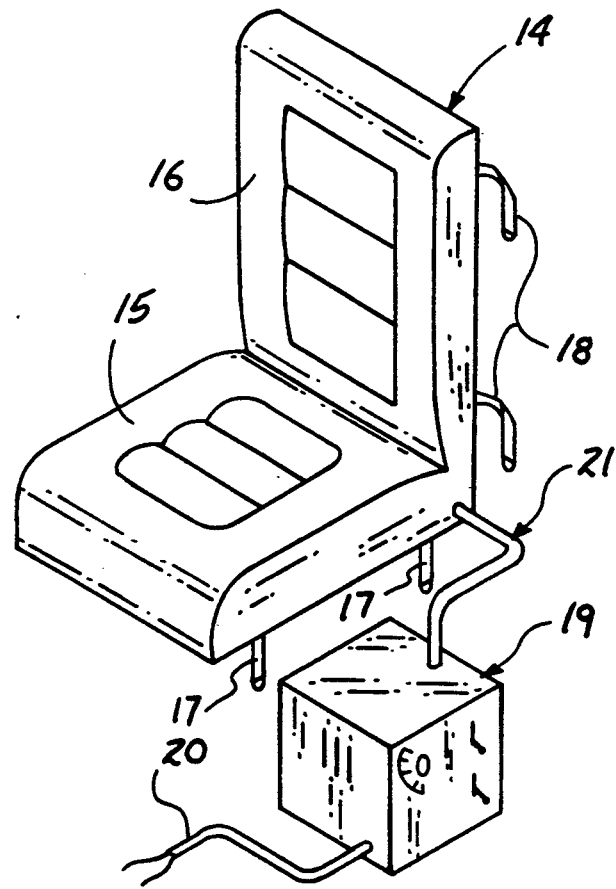
FIG. 2 is an isometric illustration of the seat member and associated control housing.
Figure 3:
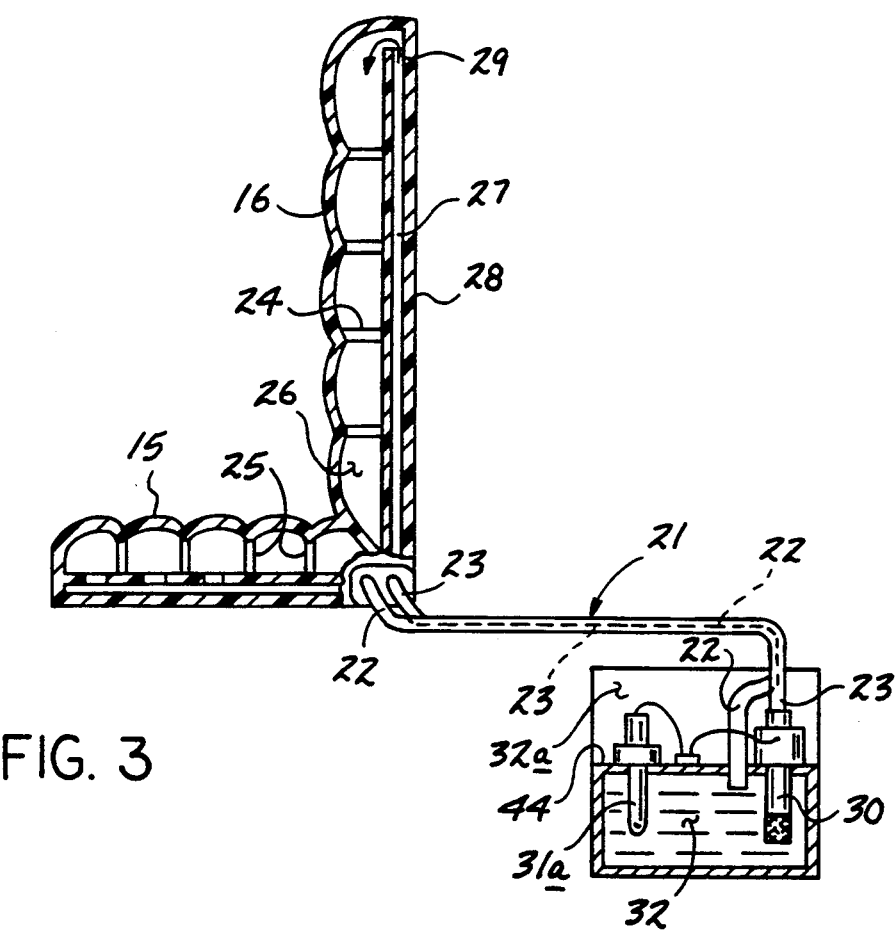
FIG. 3 is an orthographic cross-sectional illustration of the seat member and control housing.

With reference now to the drawings, and in particular to FIGS. 1 to 8 thereof, a new and improved vehicular seat construction embodying the principles and concepts of the present invention and generally designated by the reference numeral 10 will be described.

More specifically, the vehicular seat construction 10 of the instant invention essentially comprises cooperation with a vehicle 11, having a passenger compartment 12 mounting a vehicle seat 13 therewithin. The vehicle seat 13 is arranged to receive the seat member 14, that in turn includes a seat member base 15 and a seat member back 16 arranged for respective securement to the vehicle seat base and back employing respective seat base and seat back strap members 17 and 18 respectively. The strap members may be formed of any convenient construction utilizing elastomeric straps, hook and loop fasteners, and the like to permit the strap members to extend in a surrounding relationship relative to the respective vehicle seat back and base portions.

A control housing 19 is provided, including an electrical cable conduit 20 directed thereto, wherein typically the control housing is in operative communication with a vehicular battery 33 or any other independent battery source. A fluid conduit 21 is provided directed between the seat member 14 and the control housing 19, with the fluid conduit 21 including respective return and outlet fluid tubes 22 and 23, with the outlet fluid tube 23 transporting pressurized fluid from the control housing 19 to the seat member 14, with the return fluid tube 22 returning and recirculating fluid back to the control housing, and more specifically to the fluid chamber 32 of the control housing, with the control housing having a housing web 44 intermediate the control housing, with the return fluid tube 22 directed through the intermediate web and in fluid communication with the fluid chamber 32.

Figure 4:
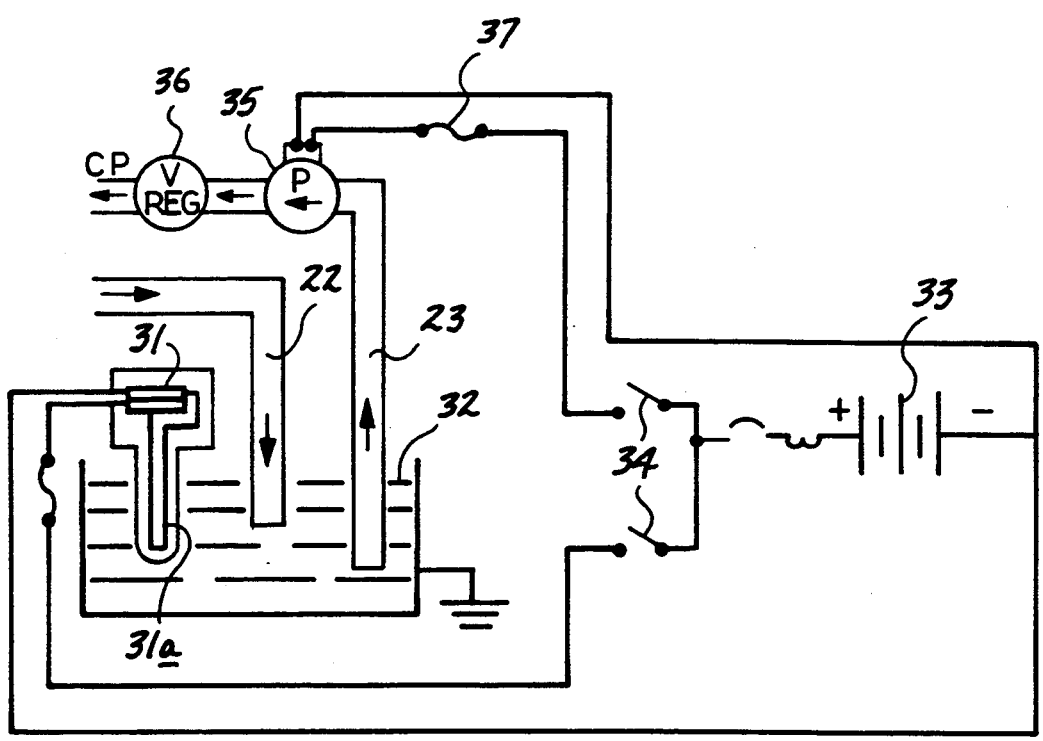
FIG. 4 is a diagrammatic illustration of the control housing.

The seat member base and back 15 and 16 each include apertured first and second baffles 24 and 25 directed throughout the seat member respective base and back to define a continuous L-shaped fluid cavity 26 throughout the seat member base and back portions such that a seat back conduit 27 in fluid communication with the outlet fluid tube 23 extends along the seat member back 16 between the seat back rear wall 28 and the L-shaped fluid cavity 26 terminating in a back conduit outlet opening 29 adjacent an uppermost end of the seat back rear wall 28 to direct fluid therefrom, wherein the return fluid tube 22 retrieves such fluid adjacent the intersection of the seat member base and back portions within the continuous fluid cavity 26. A fluid pump 30 mounted within the control housing 19 is oriented within the fluid chamber 32 to direct fluid to the outlet fluid tube 23, with a thermostatic control 31 arranged to effect operation of a heater unit 31a that projects within the fluid chamber 32 to effect heating of fluid therewithin. A double throw switch 34 effects electrical communication between the battery 33 and the pump and thermostatically controlled structure, as indicated in FIG. 4, utilizing a pressure regulator 36 and a check valve 35 to direct controlled pressurized fluid from the pump 30 to the fluid cavity 26. A fusible link 37 arranged in electrical communication between the switch structure 34 and the check valve structure 35 provides for a safety heat sensitive switching structure to prevent undue damage within the passenger compartment and to the safety control check in use of the organization.

Figure 5:
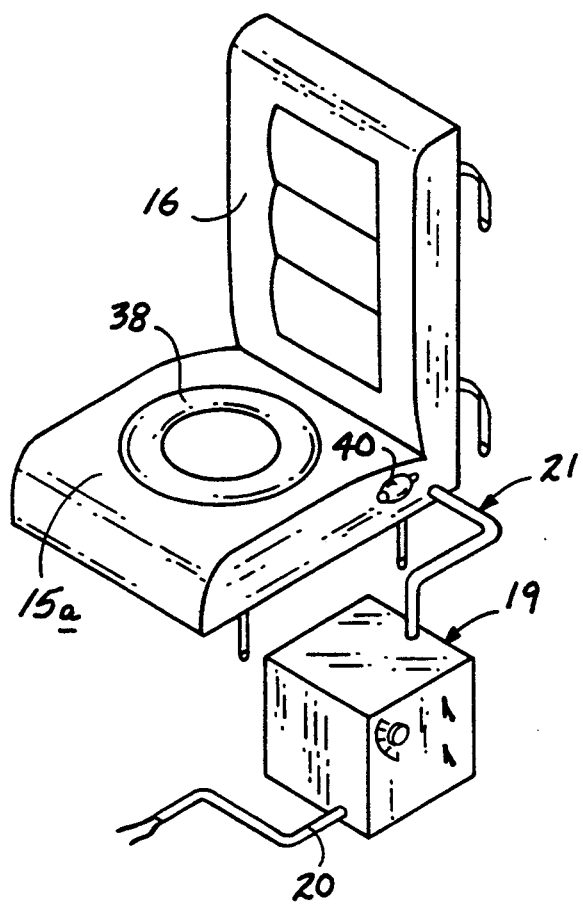
FIG. 5 is an isometric illustration of the invention employing a pneumatic shock absorption ring.
Figure 6:
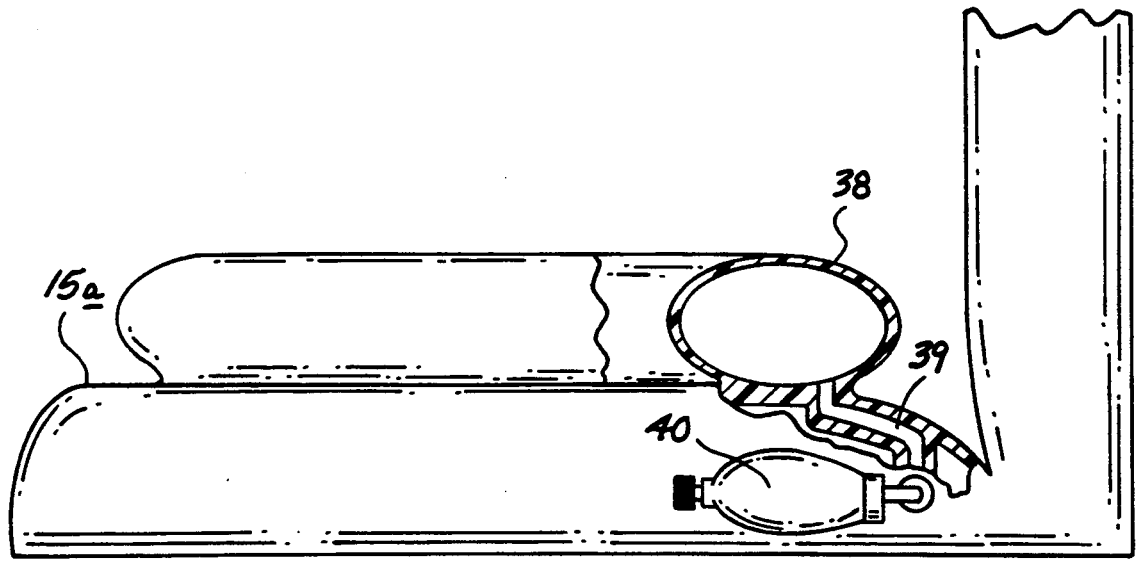
FIG. 6 is an orthographic enlarged partial view of the seat base and ring, with the ring indicated in partial cross-sectional illustration.

Reference to the FIGS. 5 and 6 indicates the use of a torroidal pneumatic chamber 38 mounted upon the seat member base 15, having a pneumatic conduit 39 in pneumatic communication between the pneumatic chamber 38 and a pneumatic pump member 40 mounted to an exterior surface of the seat member base 15 to effect selective inflation of the pneumatic chamber 38. A squeeze bulb structure as indicated may be employed as a pump member structure, as illustrated in FIG. 6.

Figure 7:
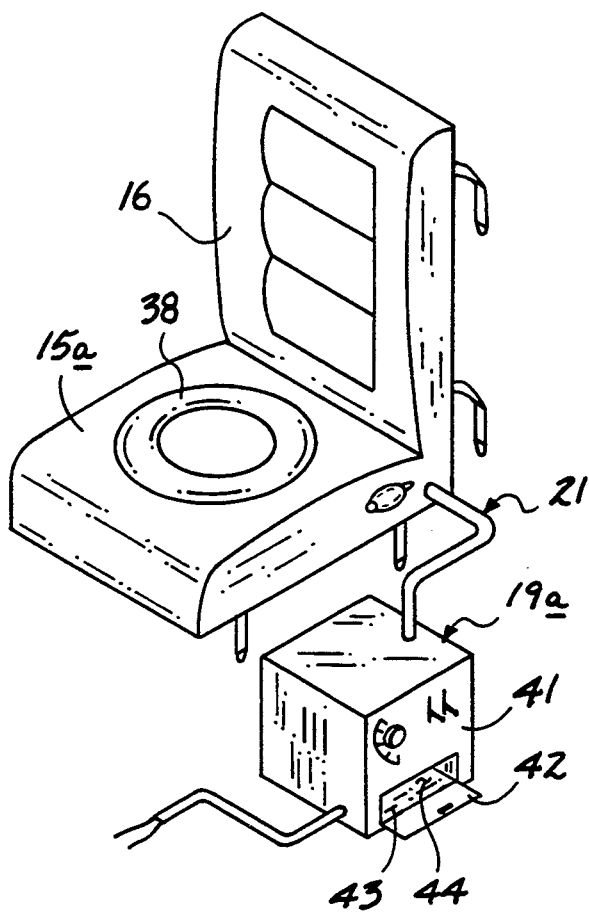
FIG. 7 is an isometric illustration of the invention further employing a heating chamber within the control housing.
Figure 8:
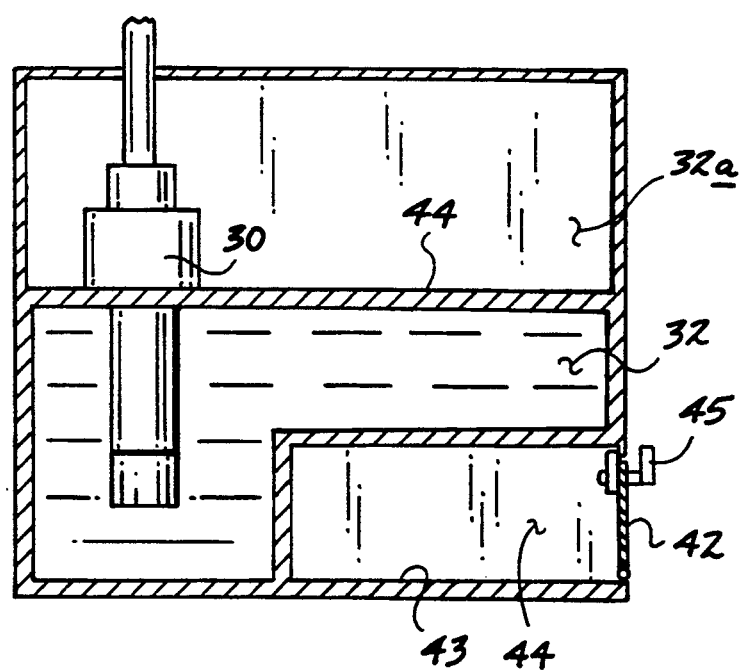
FIG. 8 is an orthographic cross-sectional illustration of the heating chamber within the control housing.

The FIGS. 7 and 8 further indicates the organization to include the control housing 19 having a housing front wall 41, including a housing front wall door 42 hingedly mounted relative to the housing floor 43 utilizing a door latch 45 providing for a heating chamber 44 in fluid separation from the heated water within the fluid chamber 32, but utilizing such heated fluid wherein heat transmission into the heating chamber 44 permits an individual to maintain various foods and items in a heated state for use of the organization. Further, it should be noted that the circuit chamber 32a is separated from the fluid chamber 32 by the housing web 44, as indicated in the FIGS. 3 and 8, to provide for a compact unitary construction easily retrofitted relative to a passenger compartment 12 and associated vehicle 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted falling within the scope of the invention.

What is claimed as being new and desired to be protected by LETTERS PATENT of the United States is as follows:

1. A vehicular seat construction, comprising,
a vehicle seat, having a vehicle seat back and a vehicle seat base, and a seat member, having a seat member base and a seat member back, with the seat member base including seat base strap members secured about said vehicle seat base, and seat back strap members secured about said vehicle seat back, with the seat member including a continuous L-shaped fluid cavity directed through the seat member through the seat member base and the seat member back, with the L-shaped cavity having apertured first baffles positioned within the seat member back, and with apertured second baffles positioned within the seat member base, and
a control housing, the control housing including a fluid chamber, and a fluid pump mounted within the fluid chamber, and a fluid conduit directed between the seat member and the control housing, with the fluid conduit having an outlet fluid tube in fluid communication with the fluid pump and the L-shaped fluid cavity, and a return fluid tube directed from the L-shaped fluid cavity to the fluid chamber, and the fluid chamber further includes a heater unit, with the heater unit including a thermostat member to effect heating of fluid within the fluid chamber, and the seat member back includes a seat back rear wall and a seat back conduit in fluid communication with the outlet fluid tube, said conduit extending along the seat member back, with the seat member back having an uppermost distal end spaced from the seat member base, said conduit in fluid communication with the L-shaped fluid cavity and directing fluid from the fluid chamber into the L-shaped fluid cavity.

2. A vehicular seat construction as set forth in claim 1 wherein the control housing includes a housing web within the control housing, with the control housing having a control housing top wall and a control housing floor, and the housing web positioned between the control housing top wall and the control housing floor, with a circuit chamber oriented between the top wall and the housing web, and the housing web including a housing web aperture receiving the return fluid tube therethrough.

3. A vehicular seat construction as set forth in claim 2 wherein the control housing includes a control housing front wall, and the control housing front wall includes a door hingedly mounted to the control housing floor, and a fluid impermeable chamber directed into the fluid chamber permitting heating within the heating chamber from the fluid chamber with the door oriented to permit access to the fluid impermeable chamber.

4. A vehicular seat construction as set forth in claim 3 wherein the seat member base includes a torroidal pneumatic chamber, the pneumatic chamber including a pneumatic conduit in pneumatic communication with the pneumatic chamber at a first end of the pneumatic conduit, the pneumatic conduit having a second end, with the second end including a pump member to effect selective inflation of the pneumatic chamber on the seat member.

* * * * *